(12) United States Patent
Aoki

(10) Patent No.: US 6,927,937 B2
(45) Date of Patent: Aug. 9, 2005

(54) READ/WRITE HEAD FOR A MAGNETIC TAPE DEVICE HAVING GROOVES FOR REDUCING TAPE FLOATING

(75) Inventor: Kenji Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 42 days.

(21) Appl. No.: 10/014,333

(22) Filed: Dec. 11, 2001

(65) Prior Publication Data

US 2002/0075594 A1 Jun. 20, 2002

(30) Foreign Application Priority Data

Dec. 11, 2000 (JP) ......................... 2000-376587

(51) Int. Cl.$^7$ ..................... G11B 5/187; G11B 5/31
(52) U.S. Cl. ..................... 360/122; 360/129
(58) Field of Search ..................... 360/121–122, 360/125, 129, 231

(56) References Cited

U.S. PATENT DOCUMENTS

| | | | | |
|---|---|---|---|---|
| 4,291,352 A | * | 9/1981 | Gooch | 360/121 |
| 4,298,899 A | * | 11/1981 | Argumedo et al. | 360/122 |
| 5,034,838 A | * | 7/1991 | Brock et al. | 360/122 |
| 5,220,473 A | * | 6/1993 | Brock et al. | 360/121 |
| 5,602,703 A | * | 2/1997 | Moore et al. | 360/121 |
| 5,751,527 A | * | 5/1998 | Sundaram et al. | 360/122 |
| 5,953,184 A | * | 9/1999 | Barber et al. | 360/121 |
| 5,963,401 A | * | 10/1999 | Dee et al. | 360/316 |
| 6,151,191 A | * | 11/2000 | Muftu et al. | 360/271.1 |
| 6,282,055 B1 | * | 8/2001 | Lakshmikumaran et al. | 360/122 |
| 6,433,959 B1 | * | 8/2002 | Lakshmikumaran et al. | 360/122 |
| 6,496,328 B1 | * | 12/2002 | Dugas | 360/121 |
| 6,690,542 B1 | * | 2/2004 | Wang | 360/129 |

* cited by examiner

Primary Examiner—Brian E. Miller
(74) Attorney, Agent, or Firm—Greer, Burns & Crain, Ltd

(57) ABSTRACT

A read/write head for a magnetic tape includes an elongated chip assembly and a tape running surface formed in the longitudinal direction of the chip assembly. A pair of substantially spaced parallel read/write gap lines for supporting read/write elements extend longitudinally along the tape running surface of the chip assembly. Also, at least one groove is formed on the tape running surface on both sides of each of the read/write gap lines and extends substantially parallel to the read/write gap lines.

9 Claims, 3 Drawing Sheets

READ/WRITE HEAD FOR A MAGNETIC TAPE DEVICE HAVING GROOVES FOR REDUCING TAPE FLOATING

BACKGROUND

The present invention generally relates to magnetic tape devices, and more particularly to a read/write head of a magnetic tape device which is configured and adapted to reduce the amount of tape floating that occurs at high tape speeds.

In general, conventional read/write heads used in typical magnetic tape devices are constructed such that the magnetic tape travels over a tape running surface of the heads. Reading and writing operations are conducted on the tape using read/write elements which are arranged along the tape running surface. To conduct the reading and writing operations with a suitable level of efficiency, the amount of tape floating, i.e., the distance between the tape running surface of the head and the recording surface of the tape, needs to be reduced as much as possible while the magnetic tape is traveling over the running surface. This has been difficult to accomplish, particularly in magnetic tape devices that generate high magnetic tape speeds to increase data capacity.

SUMMARY OF THE INVENTION

The read/write head for a magnetic tape device in accordance with the invention includes parallel grooves that reduce tape floating even at high tape speeds.

DETAILED DESCRIPTION OF THE INVENTION

Broadly stated, the present invention is directed to a read/write head of a magnetic tape, and includes a first elongated chip assembly which is fixedly adhered to a second elongated chip assembly, a tape running surface formed in the longitudinal direction of the chip assemblies, and a read/write gap line for supporting a read/write element extending longitudinally along the tape running surface on each of the two chip assemblies. The head also includes at least one groove formed on both sides of the read/write gap line on each of the chip assemblies. The grooves extend substantially parallel to the read/write gap line.

In accordance with another aspect of the invention, a read/write head for a magnetic tape includes an elongated chip assembly and a tape running surface formed in the longitudinal direction of the chip assembly. A pair of substantially spaced parallel read/write gap lines for supporting read/write elements extend longitudinally along the tape running surface of the chip assembly. At least one groove is formed on the tape running surface on both sides of each of the read/write gap lines and extends substantially parallel to the read/write gap lines.

Figure 1:
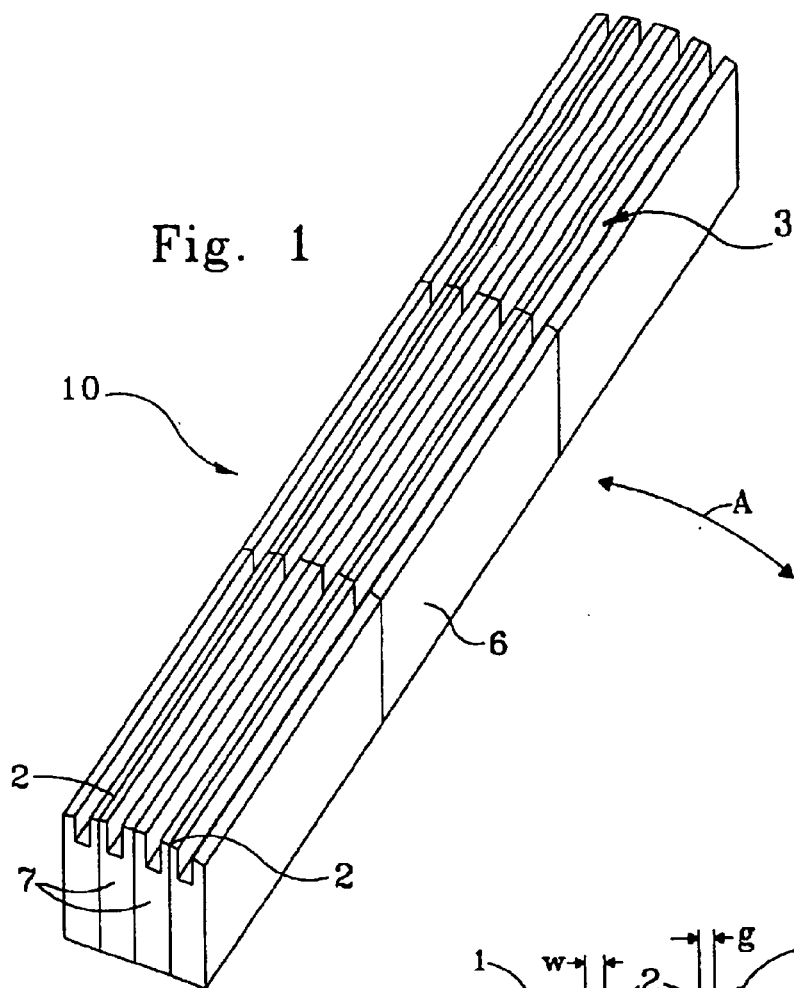
FIG. 1 is a perspective view of a read/write head in accordance with the invention.
Figure 2:
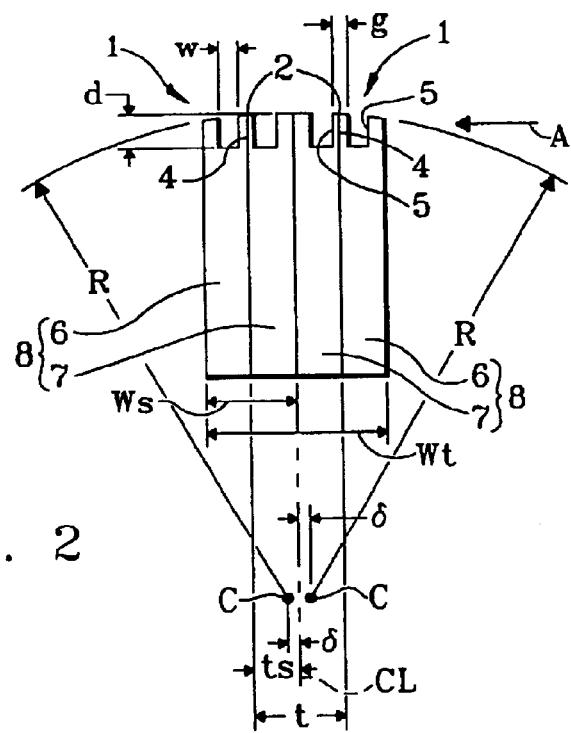
FIG. 2 is a front view of the read/write head of FIG. 1.

Turning now to FIGS. 1 and 2, the magnetic head of the present invention is indicated generally at 10, and includes a pair of two-piece chip assemblies 8, each having an element block 6 and an opposing block 7. Preferably the opposing block 7 is formed to quarry from preformed ceramic, and the element block 6 is cut from a wafer that has been formed preferably using a thin film process in which a read/write element (not shown) is constructed on top of a ceramic substrate. The opposing block 7 is adhered to the element block 6 forming a junction between the two blocks 6, 7. The two chip assemblies 8 are arranged so that the two opposing blocks 7 are pressed together to also form a junction (a centerline CL) between them.

An R-type polishing device, for example, is used to machine a curved surface along a circular line having a radius R for each chip assembly 8 in order to form an apex portion 1. As shown in FIG. 2, centers C of the respective apex portions 1 are slightly biased by a value δ toward their respective element blocks 6 from the junction CL between the chip assemblies 8. When the chip assemblies 8 are joined together, they form a tape running surface 3 (best shown in FIG. 1). It should be noted that the area on the tape running surface 3 near the junction CL between the two chip assemblies 8 is slightly lower than an apex or top of the circular lines that define the apex portion 1 of the chip assemblies.

In accordance with the invention, a pair of grooves 5 are formed on each chip assembly 8 along generally the entire length of the tape running surface 3, i.e., transverse to a direction A in which the magnetic tape (not shown) travels (best shown FIG. 1). These grooves 5 are formed in the apex portions 1 of each chip assembly 8 to the left and right of a read/write element (not shown) formed on a read/write gap line 2, which also extends the entire length of the head 10.

It should be understood that the configuration of the grooves 5, particularly the width and the depth of the grooves, have a significant influence on the amount of tape floating when the magnetic tape is traveling at a high rate of speed. In the preferred embodiment, the width w and the depth d (the distance from the top of the apex portion 1 to the bottom surface of the groove 5) of the grooves 5, and the width g of a wall portion 4 between the two grooves of each chip assembly 8, which includes the read/write gap line, satisfy the following conditions:

$$w \geq g \qquad (1)$$

$$d \geq w \qquad (2).$$

Under these conditions, the amount of tape floating does not appreciably increase even when the traveling speed of the magnetic tape is increased. In contrast, when the width w and the depth d do not satisfy the above conditions, the amount of tape floating increases generally linearly by a relatively large factor with the increase in the traveling speed of the magnetic tape.

Figure 3:
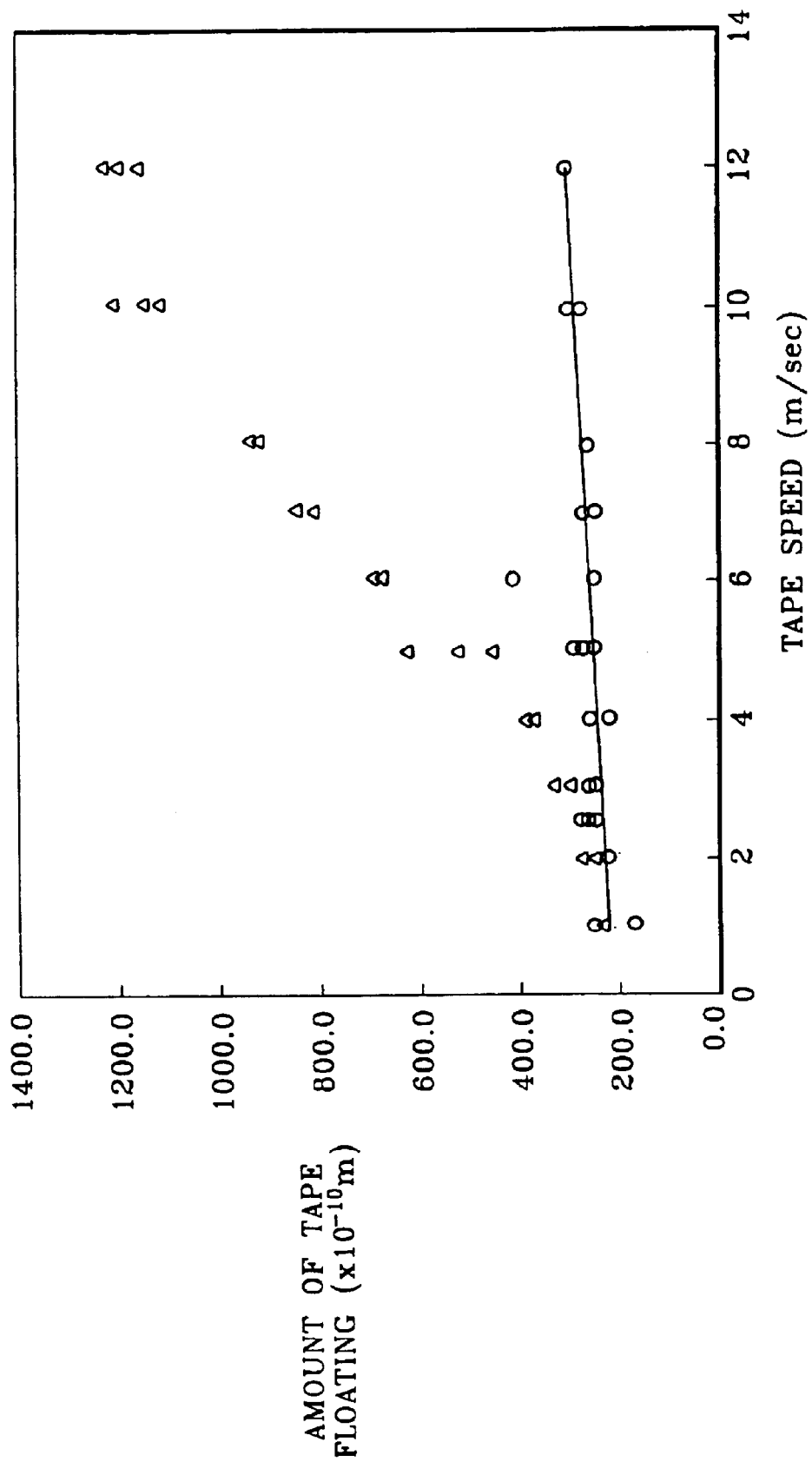
FIG. 3 is a graph illustrating tape floating at various tape speeds over the read/write head of the invention, compared with a conventional head.

A plot of circles in FIG. 3 was generated from measurements taken from a magnetic tape floating test in which a magnetic tape was made to travel over the head 10 of the invention at various speeds. The dimensions of the head 10 were as follows: A total width (Wt) of the head of 3 mm; a width (Ws) of each individual chip assembly 8 of 1.5 mm; the radius of the circular line of the apex portion 1 of each chip assembly of 7.5 mm; a bias value (2×δ) between the curve centers C of 0.4 mm; the combined plate thickness (t) of the two opposing blocks 7 of 1.5 mm; and a plate thickness (ts) of each individual chip assembly of 0.75 mm. The grooves 5 of the head 10 included the width w of 0.35 mm and the depth d of 0.5 mm. Each of the two chip assemblies 8 was formed such that the width g of the wall portion 4 was equal to 0.25 mm.

The plot of triangles was generated from a head having dimensions that were the same as that of the head shown in FIG. 1, but with the groove width w of 0.1 mm, which is smaller than the width g of the wall portion 4 (0.25 mm). Thus, the dimensions of this head did not satisfy condition (1) above, i.e., the condition w≧g was not met.

The graph of FIG. 3 shows the test results based on the relationship between the traveling speed of the magnetic tape, as shown along the x-axis, and the amount of tape floating over the running surface 3, as shown along the y-axis. A straight line is drawn with respect to the results obtained from the magnetic head 10 of the invention based on the method of least squares. As shown in the graph, the increase in the amount of tape floating follows the increase in the traveling speed of the magnetic tape in the case where the head used does not satisfy condition (1). In contrast, while a slight increase in the floating amount is evident, the path of the straight line is nearly parallel to the x-axis in the case where the head 10 of the invention is used. Thus, there is no appreciable increase in the floating amount of the tape even when the traveling speed of the tape is increased.

Figure 4:
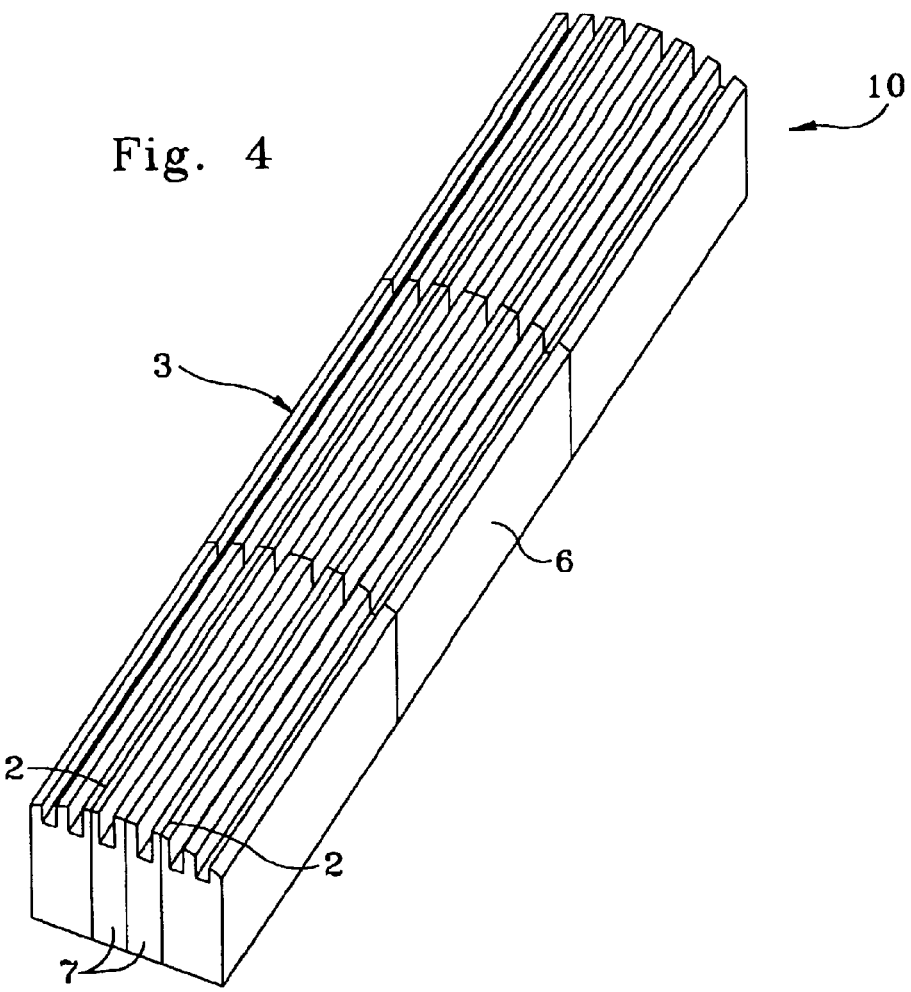
FIG. 4 is a perspective view of a read/write head in accordance with another aspect of the present invention.
Figure 5:
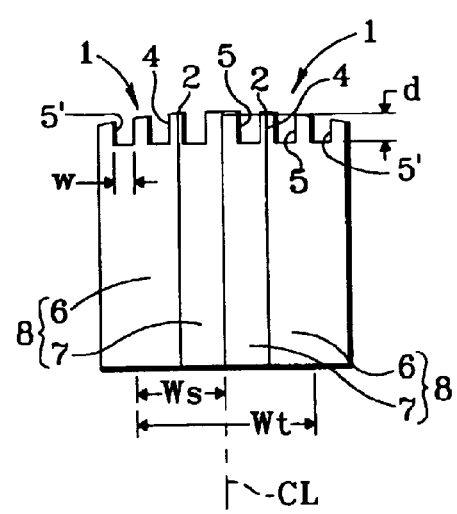
FIG. 5 is a front view of the head of FIG. 4.

Turning now to FIGS. 4 and 5, the magnetic head 10 in accordance with another aspect of the invention includes the element block 6 that has an increased thickness relative to the opposing block 7 in both of the adjacent chip assemblies 8. Also, an additional groove 5' is formed on each of the element block 6 in the apex portion 1. The element block 6 is formed to a specific plate thickness by grinding the rear surface (opposite the surface that adheres to the opposing block 7) of the wafer. Increasing the thickness of the element block 6 requires less amount of grinding of the wafer, which makes it possible to improve the level of production efficiency.

In a test using the magnetic read/write head 10 having the element block 6 with increased width, the chip assembly 8 width Ws of 2.35 mm, the head width Wt of 4.7 mm, and the grooves 5 and 5' having dimensions provided above that satisfy conditions (1) and (2), the results were nearly identical to those obtained in the first embodiment.

From the foregoing description, it should be understood that an improved magnetic read/write head for a tape device has been shown and described which has many desirable attributes and advantages. Grooves formed on the tape running surface of the head make it possible to conduct an efficient read/write operation without an increase in the tape floating amount of a magnetic tape from the head surface, even in cases where the traveling speed of said magnetic tape is increased.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A head for reading and writing data from and to a magnetic tape, comprising:
   a first elongated chip assembly fixedly adhered to a second elongated chip assembly;
   a tape running surface formed in the longitudinal direction of said first and second chip assemblies;
   a read/write gap line for supporting a read/write element extending longitudinally along said tape running surface on each of said first and second chip assemblies; and
   at least one groove formed on each side of said read/write gap line on each of said first and second chip assemblies and extending substantially parallel to said read/write gap line,
   wherein each of said grooves has a width which is greater than or equal to a width of an entire wall separating said grooves on both sides of each said read/write gap line, and a depth which is greater than or equal to said width of said grooves,
   wherein said tape running surface of said first and second chip assemblies has a curved portion along respective circular lines having respective centers which are offset a predetermined distance from a center line where said first and second chip assemblies are joined.

2. The head as defined in claim 1 wherein said depths of said grooves are measured from a top of said curved portion of said tape running surface of corresponding said first and second chip assemblies, to a bottom of said grooves.

3. The head as defined in claim 1 wherein each of said first and second chip assemblies includes a first block having a substantially planar first surface and a second block having first and second surfaces, said first surface of said first block being attached to said first surface of said second block, and said second surface of said second block of said first chip assembly is adhered to said second surface of said second block of said second chip assembly.

4. The head as defined in claim 1 wherein each of said first and second chip assemblies includes one said groove formed on a first side of said read/write gap line and two said grooves formed on a second side of said read/write gap line.

5. A head for reading and writing data from and to a magnetic tape, comprising:
   a first elongated chip assembly fixedly adhered to a second elongated chip assembly;
   a tape running surface formed in the longitudinal direction of said first and second chip assemblies;
   a read/write gap line for supporting a read/write element extending longitudinally along said tape running surface on each of said first and second chip assemblies; and
   at least one groove formed on each side of said read/write grip line on each of said first and second chip assemblies and extending substantially parallel to said read/write gap line,
   wherein each of said grooves has a width which is greater than or equal to a width of an entire wall separating said grooves on both sides of each said read/write gap line, and a depth which is greater than or equal to said width of said grooves,
   wherein each of said first and second chip assemblies includes a first block having a substantially planar first surface and a second block having first and second surfaces, said first surface of said first block being attached to said first surface of said second block, and said second surface of said second block of said first chip assembly is adhered to said second surface of said second block of said second chip assembly, and
   wherein said read/write gap line on each of said first, and second chip assemblies is formed in an area where said first block and said second block are joined.

6. The head as defined in claim 5 wherein said first block and said second block of said first chip assembly have substantially the same width, and said first block and said second block of said second chip assembly have substantially the same width.

7. The head as defined in claim 6 wherein said first chip assembly has substantially the same width as said second chip assembly.

8. The head as defined in claim 5 wherein a width of said first block of said first chip assembly is greater than a width of said second block of said first chip assembly, and a width of said first block of said second chip assembly is greater than a width of said second block of said second chip assembly.

9. The head as defined in claim 8 wherein each of said first and second chip assemblies includes one said groove formed on said second block.

* * * * *